(12) United States Patent
Tropper (10) Patent No.: US 6,842,671 B2
(45) Date of Patent: Jan. 11, 2005

(54) SYSTEMS AND METHODS FOR CONTROLLING HANDLING CHARACTERISTICS OF A TIRE

(76) Inventor: Matthew Bruce Tropper, 30 Southern Pkwy., Plainview, NY (US) 11803

( * ) Notice: Subject to any disclaimer, the term of this patent is extended or adjusted under 35 U.S.C. 154(b) by 0 days.

(21) Appl. No.: 10/623,165

(22) Filed: Jul. 19, 2003

(65) Prior Publication Data

US 2004/0016486 A1 Jan. 29, 2004

Related U.S. Application Data

(60) Provisional application No. 60/398,306, filed on Jul. 23, 2002.

(51) Int. Cl.$^7$ ............................. G01P 15/11; F16D 27/00
(52) U.S. Cl. ............................. 701/1; 280/90; 180/418; 73/514.08; 116/34 A; 152/525; 152/152.1

(58) Field of Search ........................... 701/1, 4, 36, 37, 701/72, 74; 180/90; 280/90; 310/11; 73/514.08; 340/442; 116/34 R, 34 A; 200/61.22; 152/525, 152.1

(56) References Cited

U.S. PATENT DOCUMENTS

| | | | | |
|---|---|---|---|---|
| 5,358,084 A | * | 10/1994 | Schramm | 192/21.5 |
| 5,587,698 A | * | 12/1996 | Genna | 340/442 |
| 6,504,271 B2 | * | 1/2003 | Chass | 310/11 |
| 6,628,017 B1 | * | 9/2003 | Chass | 310/11 |

* cited by examiner

Primary Examiner—Thomas G. Black
Assistant Examiner—Arthur D. Donnelly (57) ABSTRACT

One embodiment of the present invention relates to systems and methods for controlling handling characteristics of a tire. Another embodiment of the present invention relates to a tire having controllable handling characteristics.

30 Claims, 11 Drawing Sheets

SYSTEMS AND METHODS FOR CONTROLLING HANDLING CHARACTERISTICS OF A TIRE

CROSS-REFERENCE TO RELATED APPLICATIONS

This application claims the benefit under 35 U.S.C. 119(e) of U.S. Provisional Application Ser. No. 60/398,306, filed Jul. 23, 2002.

FIELD OF THE INVENTION

One embodiment of the present invention relates to systems and methods for controlling handling characteristics of a tire. Another embodiment of the present invention relates to a tire having controllable handling characteristics.

For the purposes of the present application the term "handling characteristics" is intended to include, but not be limited to, one or more of traction (e.g., during acceleration, during braking, during turning, on a dry surface, on a wet surface), noise, comfort, and rolling resistance.

Further, for the purposes of the present application the term "controllable handling characteristics which are variable in real-time" is intended to refer to handling characteristics which may be changed essentially contemporaneously with changes such as driver input (e.g., braking, turning), conditions of a driving surface (e.g., dry, wet), and a state of a vehicle (e.g., skidding, braking, turning, accelerating, steady-state).

BACKGROUND OF THE INVENTION

As is known in the art of tire design, certain handling characteristics of a conventional tire are interrelated. Thus, when a conventional tire is designed such that one characteristic is improved, one or more other interrelated characteristics are often worsened.

For example, an improvement in the designed rolling resistance of a conventional tire (i.e., a reduction in the rolling resistance) has traditionally detrimentally affected the tire's designed performance in other areas, such as traction. Conversely, an improvement in the designed traction of a conventional tire has traditionally detrimentally affected the rolling resistance of the tire (i.e., produced an increase in the rolling resistance).

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

One embodiment of the present invention relates to a tire having controllable handling characteristics.

Another embodiment of the present invention relates to a tire having controllable handling characteristics which are variable in real-time as needed.

Another embodiment of the present invention relates to a tire having controllable handling characteristics which are variable in real-time as needed by varying the amount of flexing that the tire is permitted to undergo (e.g., by varying the amount of flexing that a running surface is permitted to undergo and/or by varying the amount of flexing that one or both sidewalls is permitted to undergo).

Another embodiment of the present invention relates to a tire having rolling resistance which is controlled to be relatively low at relatively high speed and/or under steady-state conditions (e.g., driving on a highway) and which is controlled to be relatively high at relatively low speed and/or under non-steady-state driving conditions (e.g., during braking or maneuvering).

Another embodiment of the present invention relates to a tire having traction which is controlled to be relatively low at relatively high speed and/or under steady-state conditions (e.g., driving on a highway) and which is controlled to be relatively high at relatively low speed and/or under non-steady-state driving conditions (e.g., during braking or maneuvering).

Another embodiment of the present invention relates to a tire using a shape memory alloy in the tire (e.g., in the area adjacent the running surface and/or in one or both sidewalls) for changing shape and/or stress (when heated or cooled, and/or when an electric current is applied or removed, and/or when a magnetic field is applied or removed) in order to provide controllable handling characteristics (e.g., on a real-time basis depending upon the vehicle state (e.g. cornering, braking, accelerating, steady-state)).

Another embodiment of the present invention relates to a tire using a shape memory alloy disposed on or near an interior surface of the tire (e.g., an interior surface of the tire in the area adjacent the running surface and/or an interior surface of the tire in the area adjacent one or both sidewalls) for changing shape and/or stress (when heated or cooled, and/or when an electric current is applied or removed, and/or when a magnetic field is applied or removed) in order to provide controllable handling characteristics (e.g., on a real-time basis depending upon the vehicle state (e.g. cornering, braking, accelerating, steady-state)).

Another embodiment of the present invention relates to a tire using a shape memory alloy disposed on or near an exterior surface of the tire (e.g., an exterior surface of the tire in the area adjacent the running surface and/or an exterior surface of the tire in the area adjacent one or both sidewalls) for changing shape and/or stress (when heated or cooled, and/or when an electric current is applied or removed, and/or when a magnetic field is applied or removed) in order to provide controllable handling characteristics (e.g., on a real-time basis depending upon the vehicle state (e.g. cornering, braking, accelerating, steady-state)).

Another embodiment of the present invention relates to a tire using a viscosity-changeable fluid in the tire (e.g., in one or more chambers in the area adjacent the running surface and/or in one or more chambers in one or both sidewalls) for changing viscosity (when heated or cooled, and/or when an electric current is applied or removed, and/or when a magnetic field is applied or removed) in order to provide controllable handling characteristics (e.g., on a real-time basis depending upon the vehicle state (e.g. cornering, braking, accelerating, steadystate)).

Another embodiment of the present invention relates to a tire using a viscosity-changeable fluid disposed in one or more chambers on or near an interior surface of the tire (e.g., an interior surface of the tire in the area adjacent the running surface and/or an interior surface of the tire in the area adjacent one or both sidewalls) for changing viscosity (when heated or cooled, and/or when an electric current is applied or removed, and/or when a magnetic field is applied or removed) in order to provide controllable handling characteristics (e.g., on a real-time basis depending upon the vehicle state (e.g. cornering, braking, accelerating, steady-state)).

Another embodiment of the present invention relates to a tire using a viscosity-changeable fluid disposed in one or more chambers on or near an exterior surface of the tire (e.g., an exterior surface of the tire in the area adjacent the running surface and/or an exterior surface of the tire in the area adjacent one or both sidewalls) for changing viscosity (when heated or cooled, and/or when an electric current is applied or removed, and/or when a magnetic field is applied or removed) in order to provide controllable handling characteristics (e.g., on a real-time basis depending upon the vehicle state (e.g. cornering, braking, accelerating, steady-state)).

Another embodiment of the present invention relates to a tire using an elasticity-changeable solid in the tire (e.g., in the area adjacent the running surface and/or in one or both sidewalls) for changing elasticity (when heated or cooled, and/or when an electric current is applied or removed, and/or when a magnetic field is applied or removed) in order to provide controllable handling characteristics (e.g., on a real-time basis depending upon the vehicle state (e.g. cornering, braking, accelerating, steady-state)).

Another embodiment of the present invention relates to a tire using an elasticity-changeable solid disposed on or near an interior surface of the tire (e.g., an interior surface of the tire in the area adjacent the running surface and/or an interior surface of the tire in the area adjacent one or both sidewalls) for changing elasticity (when heated or cooled, and/or when an electric current is applied or removed, and/or when a magnetic field is applied or removed) in order to provide controllable handling characteristics (e.g., on a real-time basis depending upon the vehicle state (e.g. cornering, braking, accelerating, steady-state)).

Another embodiment of the present invention relates to a tire using an elasticity-changeable solid disposed on or near an exterior surface of the tire (e.g., an exterior surface of the tire in the area adjacent the running surface and/or an exterior surface of the tire in the area adjacent one or both sidewalls) for changing elasticity (when heated or cooled, and/or when an electric current is applied or removed, and/or when a magnetic field is applied or removed) in order to provide controllable handling characteristics (e.g., on a real-time basis depending upon the vehicle state (e.g. cornering, braking, accelerating, steady-state)).

Another embodiment of the present invention relates to a tire having controllable handling characteristics utilizing a mechanism selected from (but not limited to) the following: a shape memory alloy, a shape memory metal, a contractile polymer, a dilatant fluid, an electrorheological fluid, a ferrofluid, a magnetorheological fluid, a piezoelectric material.

In another embodiment a tire having controllable handling characteristics which are variable in real-time is provided, comprising: a mechanism for varying the amount of flexing that the tire is permitted to undergo, which mechanism includes a fluid selected from the group including, but not limited to: (a) an electrorheological fluid; (b) a magnetorheological fluid; and (c) a ferrofluid; and a mechanism for applying to or removing from the fluid at least one of (but not limited to): (a) an electric current; and (b) a magnetic field.

In one example the tire may be used on a vehicle driven by a driver on a driving surface and the mechanism for applying or removing may apply to or remove from the fluid least one of (but not limited to): (a) an electric current; and (b) a magnetic field based at least in part upon at least one of (but not limited to): (a) a change in input from the driver; (b) a condition of the driving surface; and (c) a state of the vehicle.

In another example: (a) the change in input from the driver may include (but not be limited to) at least one of braking and turning; (b) the condition of the driving surface may include (but not be limited to) at least one of wet and dry; and (c) the state of the vehicle may include (but not be limited to) at least one of skidding, braking, turning, accelerating, and steadystate.

In another example the mechanism for varying the amount of flexing may further include at least one chamber for containing the fluid.

In another example the tire may include two sidewalls and a running surface and the chamber may be associated with at least one of (but not limited to): (a) one of the sidewalls; and (b) the running surface.

In another example the chamber may be on an exterior surface of at least one of (but not limited to): (a) one of the sidewalls; and (b) the running surface.

In another example the chamber may be inside at least one of (but not limited to): (a) one of the sidewalls; and (b) the running surface.

In another example the chamber may be on an interior surface of at least one of (but not limited to): (a) one of the sidewalls; and (b) the running surface.

In another example the amount of flexing that the tire is permitted to undergo may at least partially determine the handling characteristics of the tire.

In another example the handling characteristics of the tire may include (but not be limited to): (a) traction; (b) noise; (c) comfort; and (d) rolling resistance.

In another embodiment a system for controlling, in real-time, handling characteristics of a tire which is used on a vehicle driven by a driver on a driving surface is provided, comprising: a mechanism for detecting at least one of, but not limited to: (a) a change in input from the driver; (b) a condition of the driving surface; and (c) a state of the vehicle and for generating a control signal in response thereto; a mechanism for varying the amount of flexing that the tire is permitted to undergo, which mechanism includes a fluid selected from the group of, but not limited to: (a) an electrorheological fluid; (b) a magnetorheological fluid; and (c) a ferrofluid; and a mechanism responsive to the control signal for applying to or removing from the fluid at least one of but not limited to: (a) an electric current; and (b) a magnetic field.

In one example: (a) the change in input from the driver may include at least one of (but not limited to) braking and turning; (b) the condition of the driving surface may include at least one of (but not limited to) wet and dry; and (c) the state of the vehicle may include at least one of (but not limited to) skidding, braking, turning, accelerating, and steady-state.

In another example the mechanism for varying the amount of flexing may further include at least one chamber for containing the fluid.

In another example the tire may include two sidewalls and a running surface and the chamber may be associated with at least one of (but not limited to): (a) one of the sidewalls; and (b) the running surface.

In another example the chamber may be on an exterior surface of at least one of (but not limited to): (a) one of the sidewalls; and (b) the running surface.

In another example the chamber may be inside at least one of (but not limited to): (a) one of the sidewalls; and (b) the running surface.

In another example the chamber may be on an interior surface of at least one of (but not limited to): (a) one of the sidewalls; and (b) the running surface.

In another example the amount of flexing that the tire is permitted to undergo may at least partially determine the handling characteristics of the tire.

In another example the handling characteristics of the tire may include (but not be limited to): (a) traction; (b) noise; (c) comfort; and (d) rolling resistance.

In another embodiment a method for controlling, in real-time, handling characteristics of a tire which is used on a vehicle driven by a driver on a driving surface is provided, comprising: detecting at least one of, but not limited to: (a) a change in input from the driver; (b) a condition of the driving surface; and (c) a state of the vehicle; and applying to or removing from a fluid selected from the group of, but not limited to: (a) an electrorheological fluid; (b) a magnetorheological fluid; and (c) a ferrofluid; at least one of, but not limited to: (a) an electric current; and (b) a magnetic field responsive to the detection of at least one of (but not limited to): (a) a change in input from the driver; (b) a condition of the driving surface; and (c) a state of the vehicle.

In one example application of or removal from the fluid of at least one of (but not limited to): (a) an electric current; and (b) a magnetic field may vary the amount of flexing that the tire is permitted to undergo.

In another example: (a) the change in input from the driver may include at least one of (but not limited to) braking and turning; (b) the condition of the driving surface may include at least one of (but not limited to) wet and dry; and (c) the state of the vehicle may include at least one of (but not limited to) skidding, braking, turning, accelerating, and steady-state.

In another example the amount of flexing that the tire is permitted to undergo may at least partially determine the handling characteristics of the tire.

In another example the handling characteristics of the tire may include (but not be limited to): (a) traction; (b) noise; (c) comfort; and (d) rolling resistance.

In another example the steps are carried out in the order recited.

In another embodiment a method for controlling, in real-time, handling characteristics of a tire which is used on a vehicle driven by a driver on a driving surface is provided, comprising: detecting at least one of, but not limited to: (a) a change in input from the driver, (b) a condition of the driving surface; and (c) a state of the vehicle; and varying the amount of flexing that the tire is permitted to undergo in response to the detection of at least one of, but not limited to: (a) a change in input from the driver; (b) a condition of the driving surface; and (c) a state of the vehicle.

In one example: (a) the change in input from the driver may include at least one of (but not limited to) braking and turning; (b) the condition of the driving surface may include at least one of (but not limited to) wet and dry; and (c) the state of the vehicle may include at least one of (but not limited to) skidding, braking, turning, accelerating, and steady-state.

In another example the amount of flexing that the tire is permitted to undergo may at least partially determine the handling characteristics of the tire.

In another example the handling characteristics of the tire may include (but not be limited to): (a) traction; (b) noise; (c) comfort; and (d) rolling resistance.

In another example the steps are carried out in the order recited.

Figure 1:
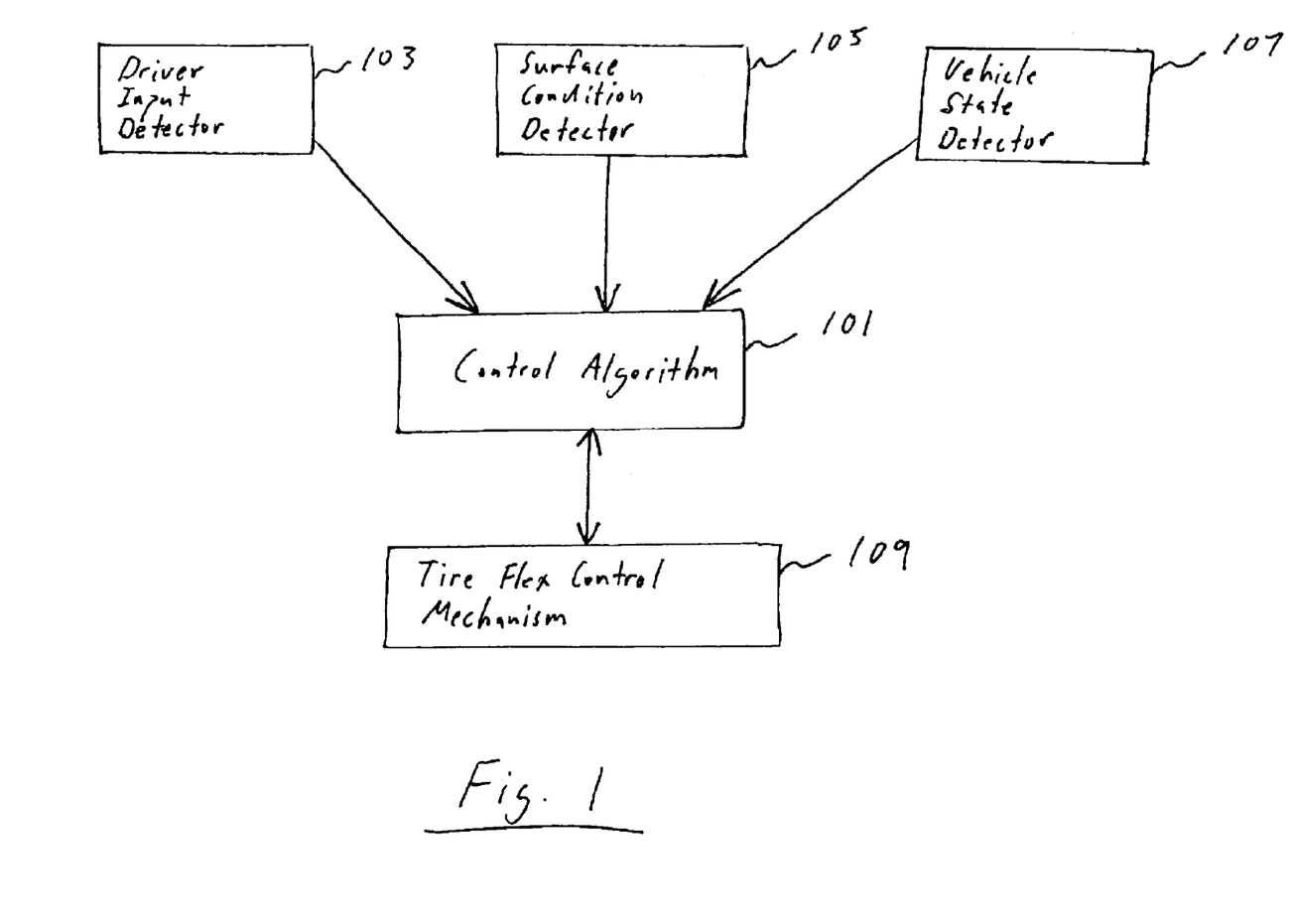
FIG. 1 shows a diagram of a system for controlling handling characteristics of a tire according to an embodiment of the present invention.

Referring now to FIG. 1, a diagram of a system for controlling handling characteristics of a tire is shown. As seen in this FIG. 1, Control Algorithm 101 (which may be run on a microprocessor, for example) receives input from Driver Input Detector 103, Surface Condition Detector 105, and/or Vehicle State Detector 107.

In one example (which example is intended to be illustrative and not restrictive) Driver Input Detector 103 may include accelerator petal position sensor, brake petal position sensor, and/or steering wheel position sensor. Of note, each of the aforementioned sensors may detect a current position (i.e., an "instantaneous" position) and/or a change in position (i.e., a change in position over a span of time). Of further note, construction and operation of each of the aforementioned sensors (as well as construction and operation of other types of sensors for detecting driver input) is well known to those of ordinary skill in the an and will not be discussed here in more detail.

In another example (which example is intended to be illustrative and not restrictive) Surface Condition Detector 103 may include air temperature sensor (i.e., thermometer), driving surface (i.e., road surface) temperature sensor (i.e., thermometer), air pressure senor (i.e., barometer), air humidity sensor, and/or tire slippage senor. Of note, each of the aforementioned sensors may detect a current value (i.e., an "instantaneous" value) and/or a change in value (i.e., a change in value over a span of time). Of further note, construction and operation of each of the aforementioned sensors (as well as construction and operation of other types of sensors for detecting condition of a driving surface) is well known to those of ordinary skill in the art and will not be discussed here in more detail.

In another example (which example is intended to be illustrative and not restrictive) Vehicle State Detector 107 may include acceleration sensor (e.g., velocity and/or direction); roll senor, pitch sensor, yaw sensor. Of note, each of the aforementioned sensors may detect a current value (i.e., an "instantaneous" value) and/or a change in value (i.e., a change in value over a span of time). Of further note, construction and operation of each of the aforementioned sensors (as well as construction and operation of other types of sensors for detecting vehicle state) is well known to those of ordinary skill in the art and will not be discussed here in more detail.

Referring once again to FIG. 1, it is seen that Control Algorithm 101 receives input from Driver Input Detector 103, Surface Condition Detector 105, and/or Vehicle State Detector 107 regarding the parameters sensed by these sensors and provides output to Tire Flex Control Mechanism 109 for controlling the flexing of a tire.

In this regard, Tire Flex Control Mechanism 109 may include: (a) the shape memory alloy mechanisms shown in FIGS. 3A–3C; (b) the viscosity-changeable fluid mechanisms shown in FIGS. 4A–4C; and/or (c) the elasticity-changeable solid mechanisms shown in FIGS. 5A–5C.

Figure 3A:
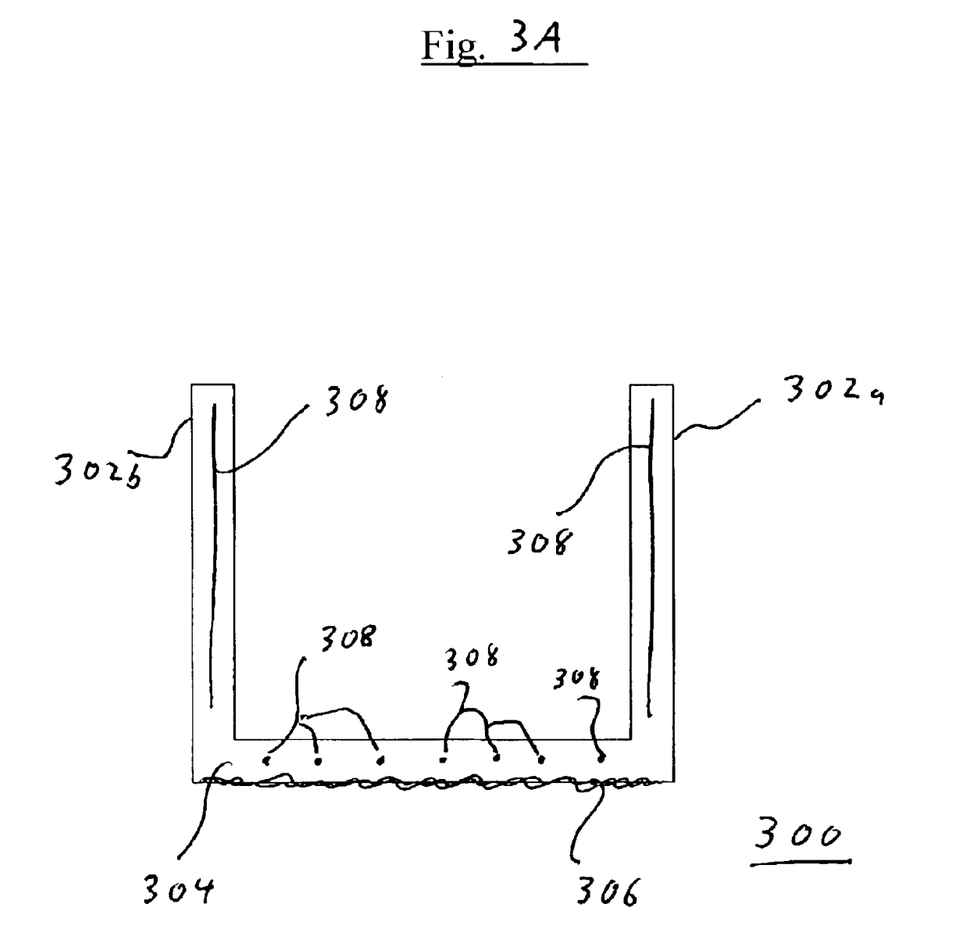
FIGS. 3A, 3B, and 3C show cross-sections of tires using shape memory alloy embodiments of the present invention.
Figure 3B:
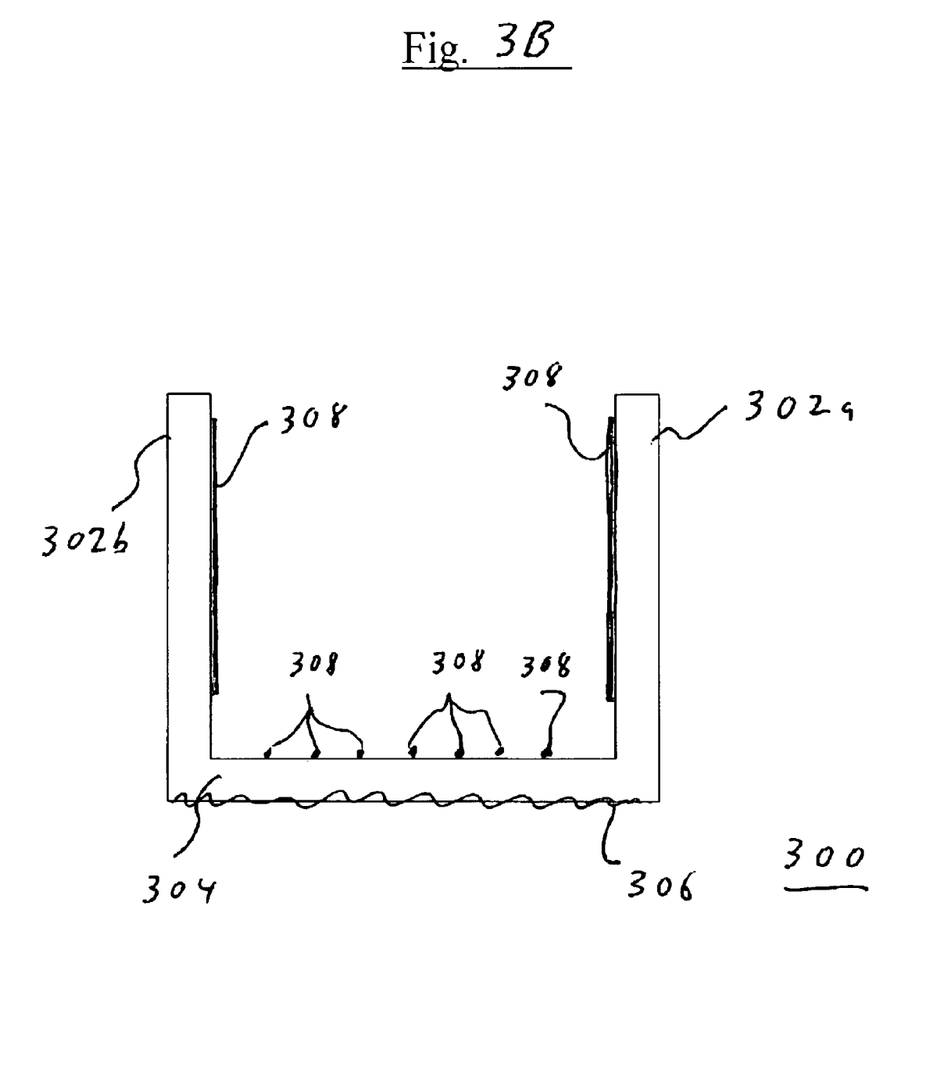
Figure 3C:
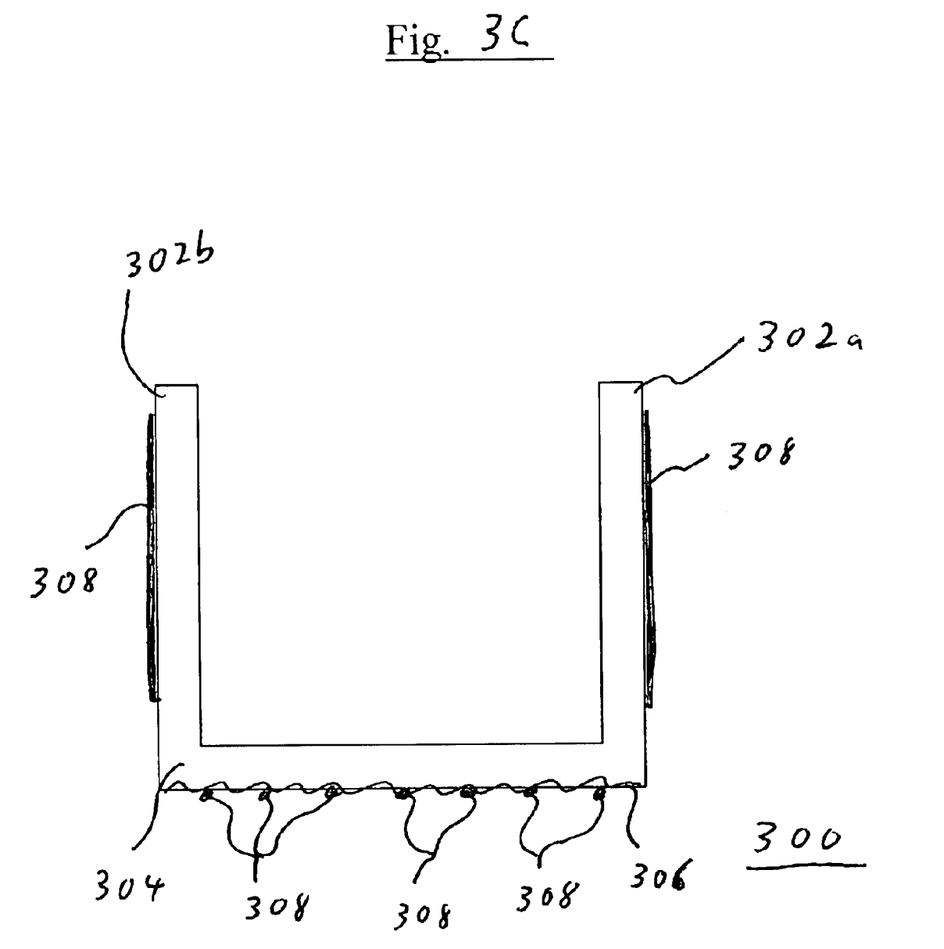

More particularly, FIGS. 3A–3C show Tire 300, which Tire 300 includes Sidewalls 302a and 302b, Running Surface 304, Tread 306, and various Shape Metal Alloy Elements 308.

Figure 4A:
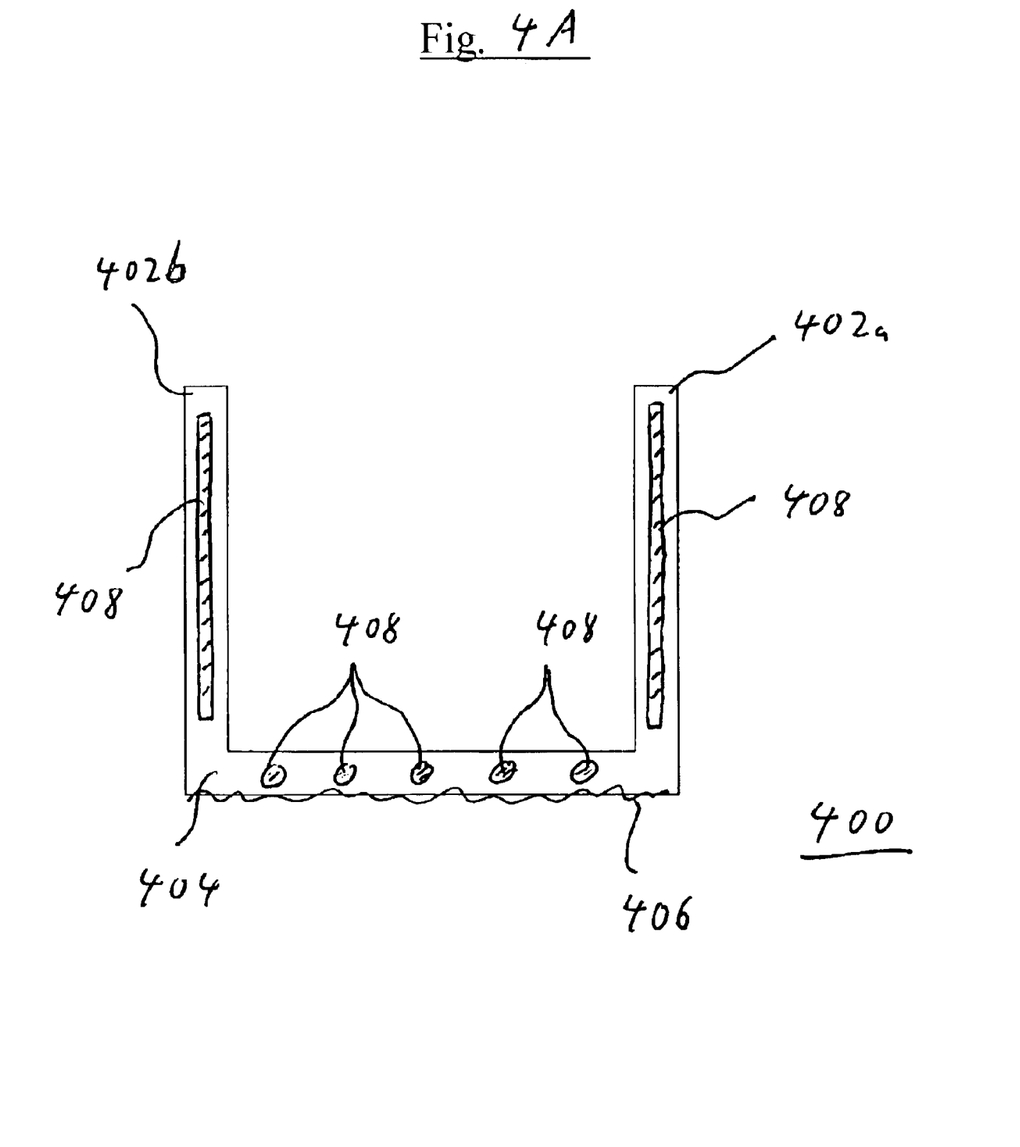
FIGS. 4A, 4B, and 4C show cross-sections of tires using viscosity-changeable fluid embodiments of the present invention.
Figure 4B:
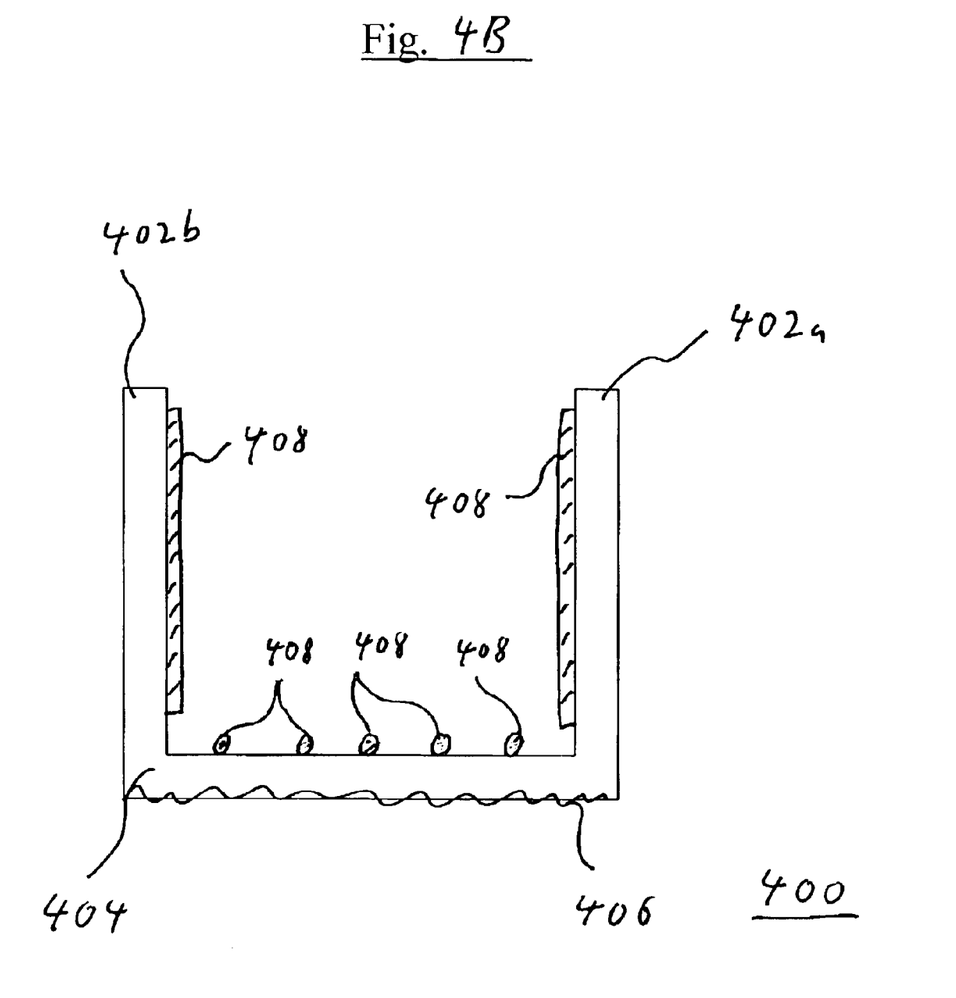
Figure 4C:
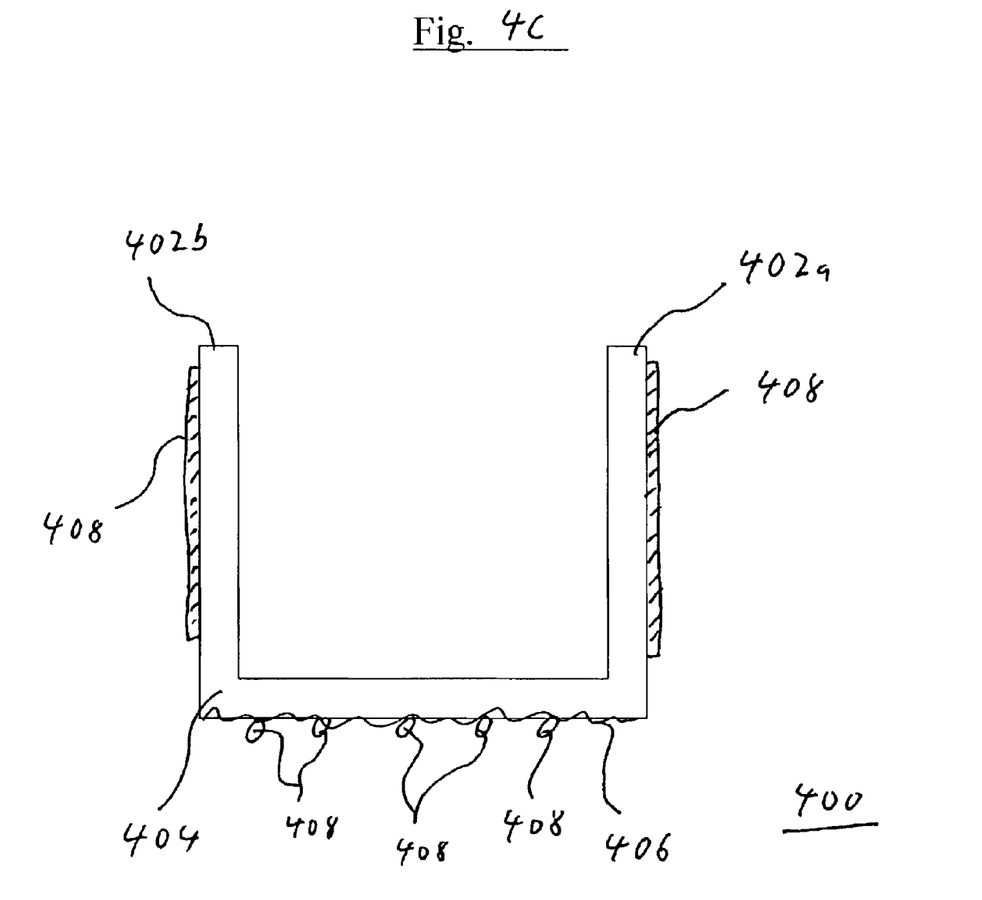

Further, FIGS. 4A–4C show Tire 400, which Tire 400 includes Sidewalls 402a and 402b, Running Surface 404, Tread 406, and various Viscosity-Changeable Fluid Chambers 408 (wherein the Viscosity-Changeable Fluid Chambers 408 are configured to hold a viscosity-changeable fluid (not shown)).

Figure 5A:
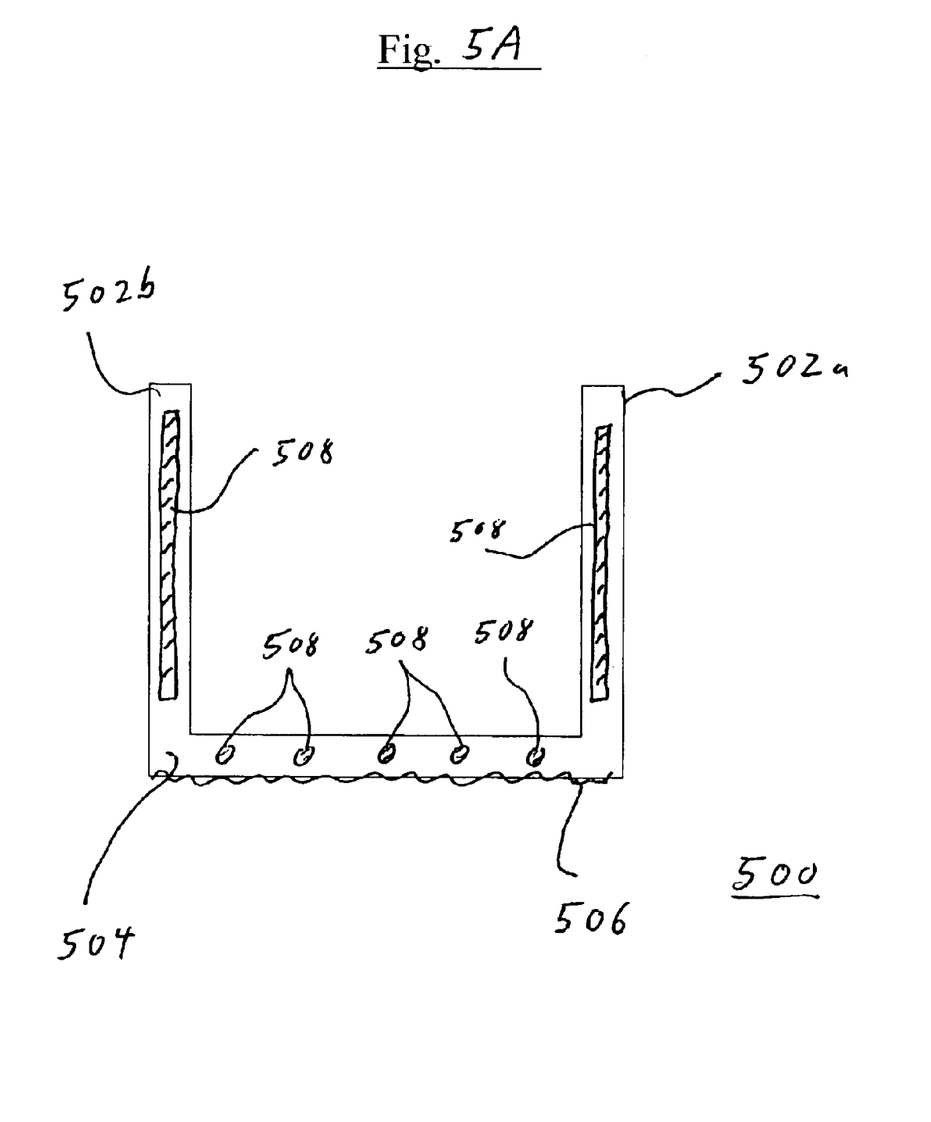
FIGS. 5A, 5B, and 5C show cross-sections of tires using elasticity-changeable solid embodiments of the present invention.
Figure 5B:
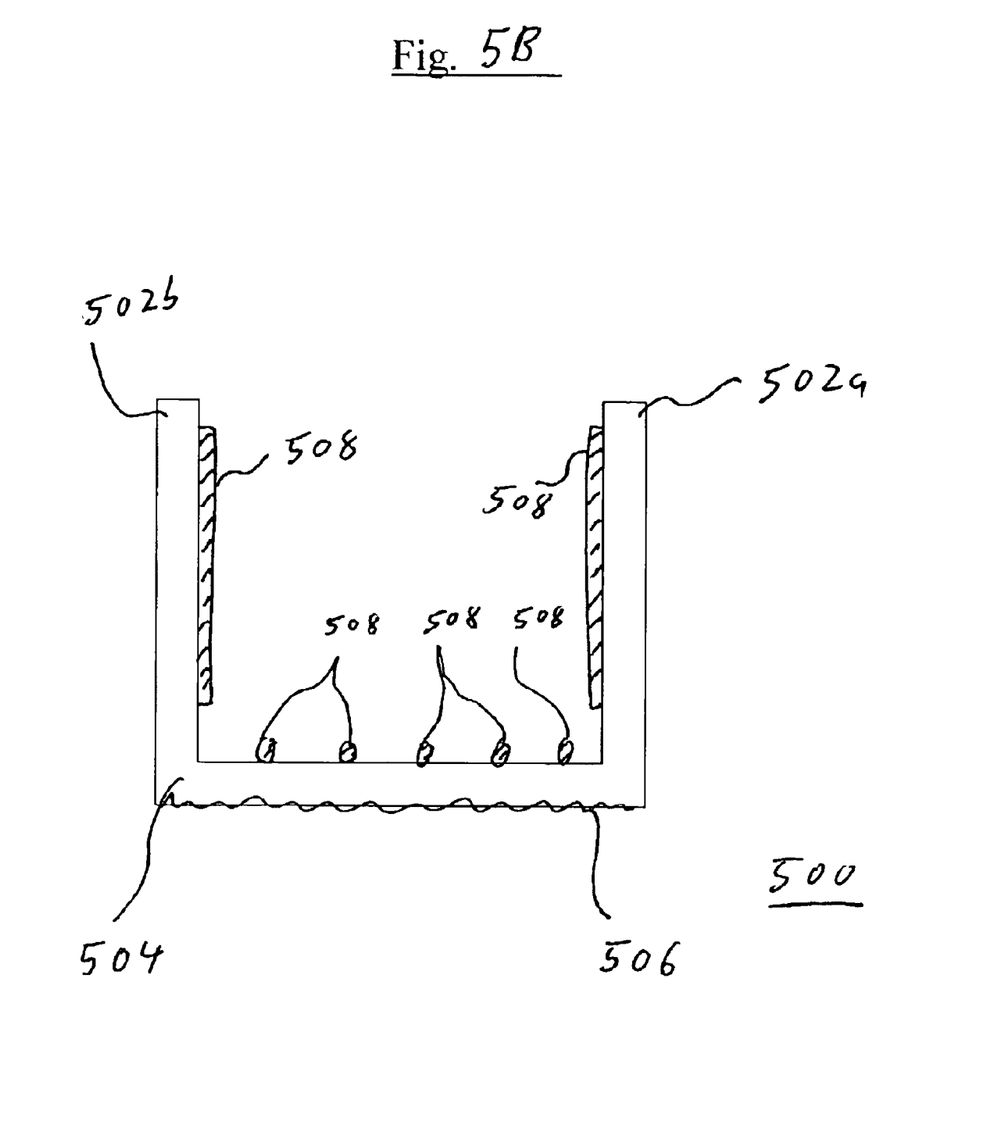
Figure 5C:
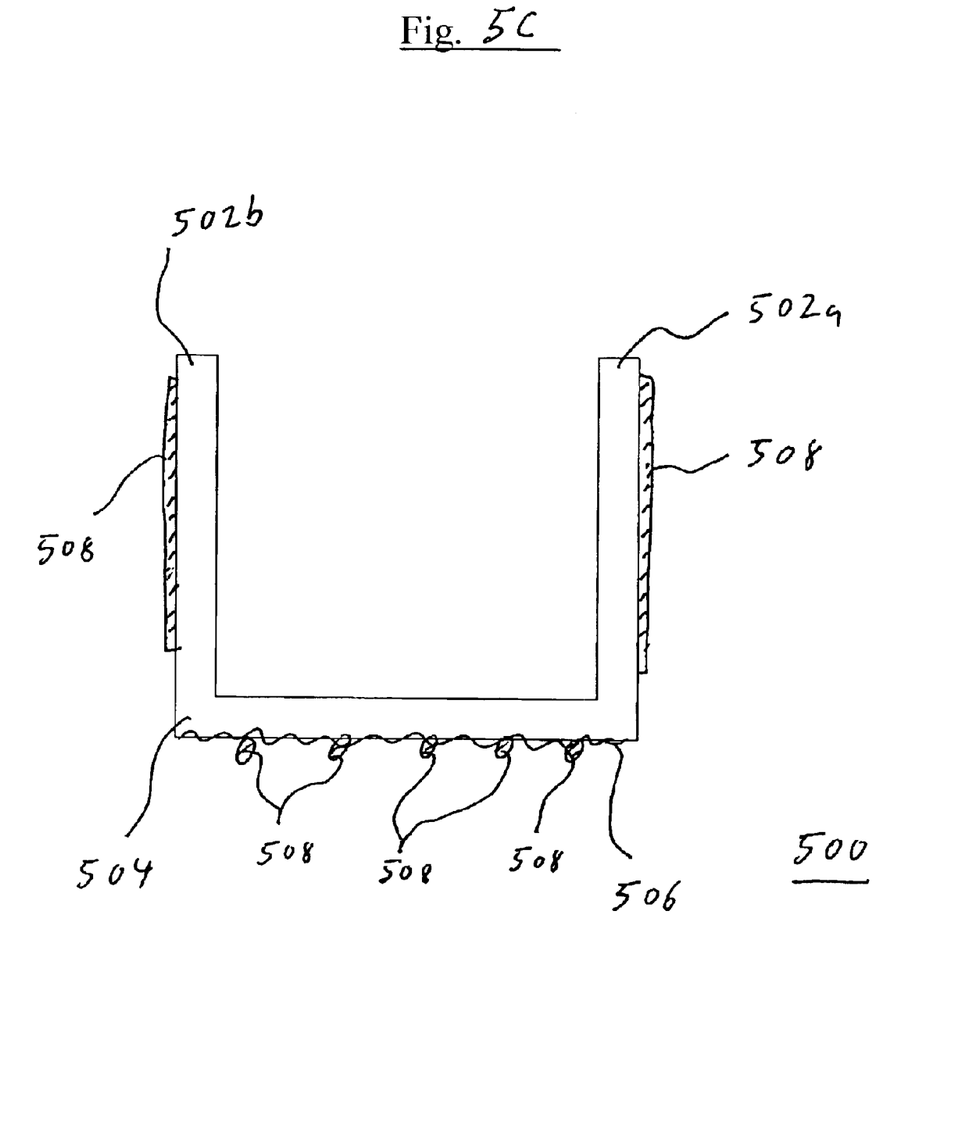

Further, FIGS. 5A–5C show Tire 500, which Tire 500 includes Sidewalls 502a and 502b, Running Surface 504, Tread 506, and various Viscosity-Changeable Solid Elements 508.

In another embodiment of the present invention, the Control Algorithm may indirectly control the Tire Flex Control Mechanism by providing output to one or more intermediary mechanisms (e.g., an electrical amplifier and/or a magnetic circuit (e.g., an electromagnet), whereby such intermediary mechanism(s) may then control the flexing of the tire (by controlling the Tire Flex Control Mechanism).

Of note, the Control Algorithm may be configured to provide any desired amount of tire flexing based upon the various detected parameters. To give a number of examples (which examples are intended to be illustrative and not restrictive) the tire flexing may be controlled to provide low rolling resistance during relatively high-speed, steady-state driving in dry weather; the tire flexing may be controlled to provide high traction during driving in wet or icy road surface conditions; the tire flexing may be controlled to provide higher traction to tires on one side of the vehicle based upon maneuvering (e.g., turning) of the vehicle; the tire flexing may be controlled to provide higher traction to tires in the front or back of the vehicle based upon braking or acceleration of the vehicle, and/or the tire flexing may be controlled to provide higher traction to certain tire(s) to stop or attenuate a skidding condition (e.g., "fishtailing"). Of course, the aforementioned examples are illustrative only, and many more configurations will be clear to those of ordinary skill in the art.

In another embodiment the Control Algorithm may be implemented in hardware, software, and/or firmware.

In another embodiment the Control Algorithm controls the Tire Flex Control Mechanism (either directly or indirectly, as described above) without receiving any feedback from the Tire Flex Control Mechanism. In other words, under this embodiment information flows between the Control Algorithm and the Tire Flex Control Mechanism only in one direction, which direction is from the Control Algorithm to the Tire Flex Control Mechanism.

In another embodiment the Control Algorithm controls the Tire Flex Control Mechanism (either directly or indirectly, as described above) by receiving feedback from the Tire Flex Control Mechanism. In other words, under this embodiment information flows between the Control Algorithm and the Tire Flex Control Mechanism in two directions, which directions are from the Control Algorithm to the Tire Flex Control Mechanism and from the Tire Flex Control Mechanism to the Control Algorithm.

Figure 2:
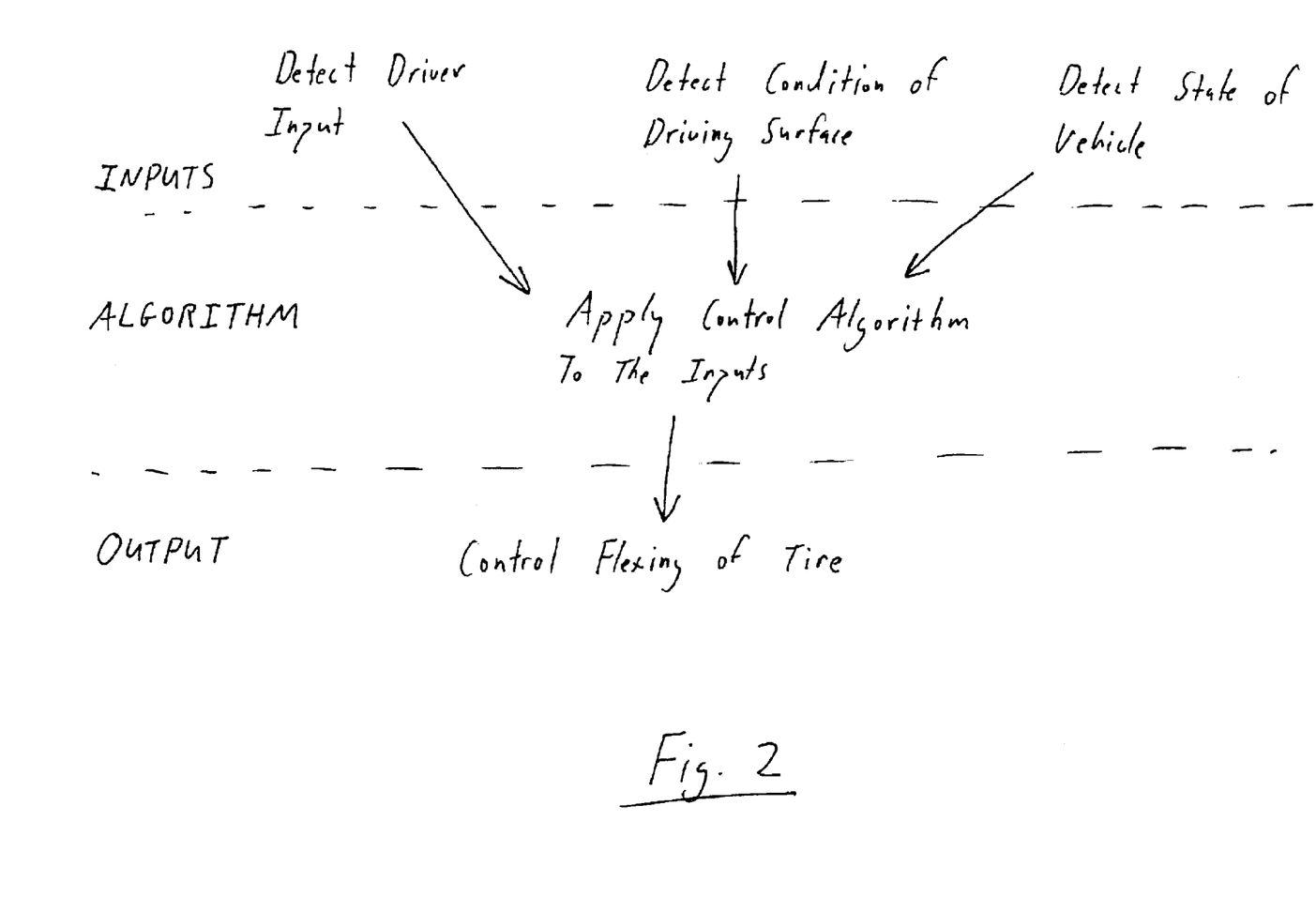
FIG. 2 shows a diagram of a method for controlling handling characteristics of a tire according to an embodiment of the present invention.

Referring now to FIG. 2, a diagram of a method according to an embodiment of the present invention is shown. As seen in this FIG. 2, the method may include detecting driver input, detecting a condition of a driving surface (i.e., road surface), and/or detecting a state of a vehicle. Further, one or more of the detected parameters are applied as inputs to a control algorithm and the control algorithm is used to control flexing of a tire (either directly or via one or more intermediary mechanisms (e.g., an electrical amplifier and/or a magnetic circuit (e.g., an electromagnet)).

Of note, while certain embodiments described herein refer to a "driver" of a vehicle, it is noted that for the purposes of the present application such driver may be physically within the vehicle or such driver may be driving the vehicle remotely (e.g., via wireless remote control). In addition, such a "driver" may be a person or a control mechanism adapted to controlling the vehicle (e.g., a computer-controlled vehicle).

While a number of embodiments of the present invention have been described, it is understood that these embodiments are illustrative only, and not restrictive, and that many modifications may become apparent to those of ordinary skill in the art. For example, at any given time certain handling characteristics of the tire may be controlled to be in one of two distinct states (i.e., "on-off control") and/or at any given time certain handling characteristics of the tire may be controlled to be in one of x number of distinct states (i.e., "stepped control") and/or at any given time certain handling characteristics of the tire may be controlled to have any desired value between two limits (i.e., "infinitely variable control"). Further, at any given time. certain handling characteristics of the tire may be controlled (e.g., in an automatic fashion) based upon input from a driver of a vehicle (e.g., braking, turning) and/or based upon conditions of a driving surface (e.g., dry, wet) and/or based upon a state of a vehicle (e.g., skidding, braking, turning, accelerating, steady-state). Further still, at any given time certain handling characteristics of the tire may be controlled in a manual fashion. Further still, the chamber(s) for holding the viscosity-changing fluid may utilize one or more ports for permitting the fluid to flow from one area of the chamber to another when the viscosity of the fluid is relatively low and for stopping or retarding the flow of the fluid from one area of the chamber to another when the viscosity of the fluid is relatively high. Further still, the flex control elements of the invention may be incorporated on and/or in the tire in any desired configuration (e.g., up and down one or both sidewalls, across one or both sidewalls, adjacent the running surface in a manner parallel to the direction of tire rotation, and/or adjacent the running surface in a manner non-parallel to the direction of tire rotation (e.g., at an angle to the direction of tire rotation). Further still, significant portions of the entire tire may be composed of a flex control element (e.g., an elasticity-changeable solid). Further still, the flex control elements disposed on and/or in the tire may be controlled via any desired mechanism (e.g., wireless, wired (e.g., slip ring), fiber optic). Further still, the flex control elements disposed on and/or in the tire may be powered via any desired mechanism (e.g., wireless, wired (e.g., slip ring), fiber optic). Further still, the invention may be applied to one or more tire(s), wheel(s), and/or any other such mechanism (s). Further still, a tire may have multiple flex control mechanisms and each of the flex control mechanisms of a given tire may be controlled independently (e.g., depending upon the driver input, the condition of the driving surface, and/or the state of the vehicle). Further still, in connection with a vehicle with multiple tires, the flexing of each tire may be controlled independently (e.g., depending upon the driver input, the condition of the driving surface, and/or the state of the vehicle).

What is claimed is:

1. A tire having controllable handling characteristics which are variable in real-time, comprising:
   a mechanism for varying the amount of flexing that the tire is permitted to undergo, which mechanism includes a fluid selected from the group of: (a) an electrorheological fluid; (b) a magnetorheological fluid; and (c) a ferrofluid; and
   a mechanism for applying to or removing from the fluid at least one of: (a) an electric current; and (b) a magnetic field.

2. The tire of claim 1, wherein the tire is used on a vehicle driven by a driver on a driving surface and wherein the mechanism for applying or removing applies to or removes from the fluid least one of: (a) an electric current; and (b) a magnetic field based at least in part upon at least one of: (a) a change in input from the driver; (b) a condition of the driving surface; and (c) a state of the vehicle.

3. The tire of claim 2, wherein:
   (a) the change in input from the driver includes at least one of braking and turning;
   (b) the condition of the driving surface includes at least one of wet and dry; and
   (c) the state of the vehicle includes at least one of skidding, braking, turning, accelerating, and steady-state.

4. The tire of claim 3, wherein the mechanism for varying the amount of flexing further includes at least one chamber for containing the fluid.

5. The tire of claim 4, wherein the tire includes two sidewalls and a running surface and the chamber is associated with at least one of: (a) one of the sidewalls; and (b) the running surface.

6. The tire of claim 5, wherein the chamber is on an exterior surface of at least one of: (a) one of the sidewalls; and (b) the running surface.

7. The tire of claim 5, wherein the chamber is inside at least one of: (a) one of the sidewalls; and (b) the running surface.

8. The tire of claim 5, wherein the chamber is on an interior surface of at least one of: (a) one of the sidewalls; and (b) the running surface.

9. The tire of claim 1, wherein the amount of flexing that the tire is permitted to undergo at least partially determines the handling characteristics of the tire.

10. The tire of claim 9, wherein the handling characteristics of the tire include: (a) traction; (b) noise; (c) comfort; and (d) rolling resistance.

11. A system for controlling, in real-time, handling characteristics of a tire which is used on a vehicle driven by a driver on a driving surface, comprising:
    a mechanism for detecting at least one of: (a) a change in input from the driver; (b) a condition of the driving surface; and (c) a state of the vehicle and for generating a control signal in response thereto;
    a mechanism for varying the amount of flexing that the tire is permitted to undergo, which mechanism includes a fluid selected from the group of: (a) an electrorheological fluid; (b) a magnetorheological fluid; and (c) a ferrofluid; and
    a mechanism responsive to the control signal for applying to or removing from the fluid at least one of: (a) an electric current; and (b) a magnetic field.

12. The system of claim 11, wherein:
    (a) the change in input from the driver includes at least one of braking and turning;
    (b) the condition of the driving surface includes at least one of wet and dry; and
    (c) the state of the vehicle includes at least one of skidding, braking, turning, accelerating, and steady-state.

13. The system of claim 12, wherein the mechanism for varying the amount of flexing further includes at least one chamber for containing the fluid.

14. The system of claim 13, wherein the tire includes two sidewalls and a running surface and the chamber is associated with at least one of: (a) one of the sidewalls; and (b) the running surface.

15. The system of claim 14, wherein the chamber is on an exterior surface of at least one of: (a) one of the sidewalls; and (b) the running surface.

16. The system of claim 14, wherein the chamber is inside at least one of: (a) one of the sidewalls; and (b) the running surface.

17. The system of claim 14, wherein the chamber is on an interior surface of at least one of: (a) one of the sidewalls; and (b) the running surface.

18. The system of claim 11, wherein the amount of flexing that the tire is permitted to undergo at least partially determines the handling characteristics of the tire.

19. The system of claim 18, wherein the handling characteristics of the tire include: (a) traction; (b) noise; (c) comfort; and (d) rolling resistance.

20. A method for controlling, in real-time, handling characteristics of a tire which is used on a vehicle driven by a driver on a driving surface, comprising:
    detecting at least one of: (a) a change in input from the driver; (b) a condition of the driving surface; and (c) a state of the vehicle; and
    applying to or removing from a fluid selected from the group of: (a) an electrorheological fluid; (b) a magnetorheological fluid; and (c) a ferrofluid; at least one of: (a) an electric current; and (b) a magnetic field responsive to the detection of at least one of: (a) a change in input from the driver; (b) a condition of the driving surface; and (c) a state of the vehicle.

21. The method of claim 20, wherein application of or removal from the fluid of at least one of: (a) an electric current; and (b) a magnetic field varies the amount of flexing that the tire is permitted to undergo.

22. The method of claim 21, wherein:
    (a) the change in input from the driver includes at least one of braking and turning;
    (b) the condition of the driving surface includes at least one of wet and dry; and (c) the state of the vehicle includes at least one of skidding, braking, turning, accelerating, and steady-state.

23. The method of claim 21, wherein the amount of flexing that the tire is permitted to undergo at least partially determines the handling characteristics of the tire.

24. The method of claim 23, wherein the handling characteristics of the tire include: (a) traction; (b) noise; (c) comfort; and (d) rolling resistance.

25. The method of claim 20, wherein the steps are carried out in the order recited.

26. A method for controlling, in real-time, handling characteristics of a tire which is used on a vehicle driven by a driver on a driving surface, comprising:

detecting at least one of: (a) a change in input from the driver; (b) a condition of the driving surface; and (c) a state of the vehicle; and varying the amount of flexing that the tire is permitted to undergo in response to the detection of at least one of:
  (a) a change in input from the driver; (b) a condition of the driving surface; and (c) a state of the vehicle.

27. The method of claim 26, wherein:

(a) the change in input from the driver includes at least one of braking and turning;

(b) the condition of the driving surface includes at least one of wet and dry; and (c) the state of the vehicle includes at least one of skidding, braking, turning, accelerating, and steady-state.

28. The method of claim 26, wherein the amount of flexing that the tire is permitted to undergo at least partially determines the handling characteristics of the tire.

29. The method of claim 28, wherein the handling characteristics of the tire include: (a) traction; (b) noise; (c) comfort; and (d) rolling resistance.

30. The method of claim 26, wherein the steps are carried out in the order recited.

* * * * *